Jan. 14, 1958 — R. H. CALUNDAN — 2,819,909
WIDE WHEEL FRONT END CONVERSION FOR TRACTORS
Filed Jan. 5, 1955 — 2 Sheets-Sheet 1
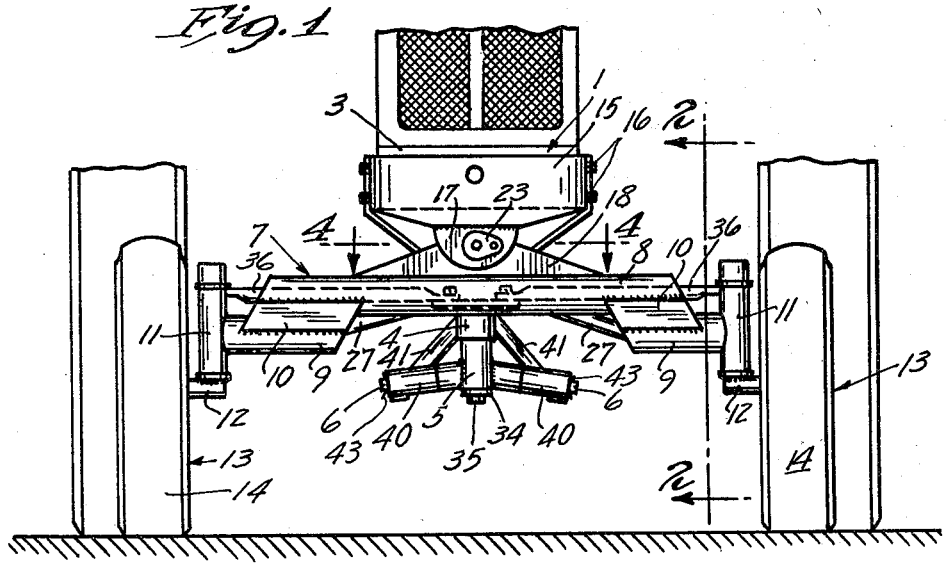
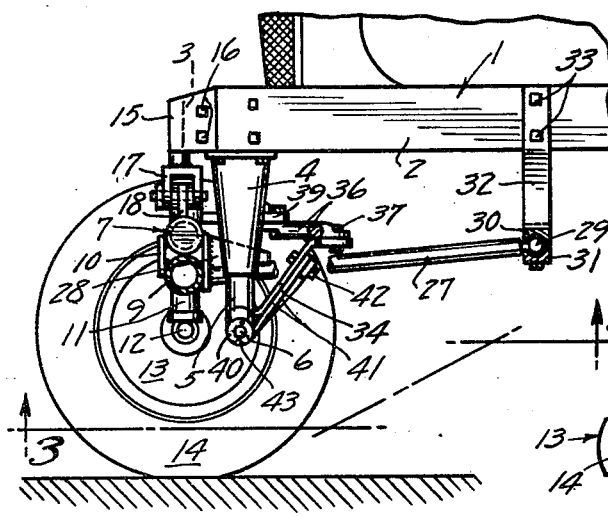
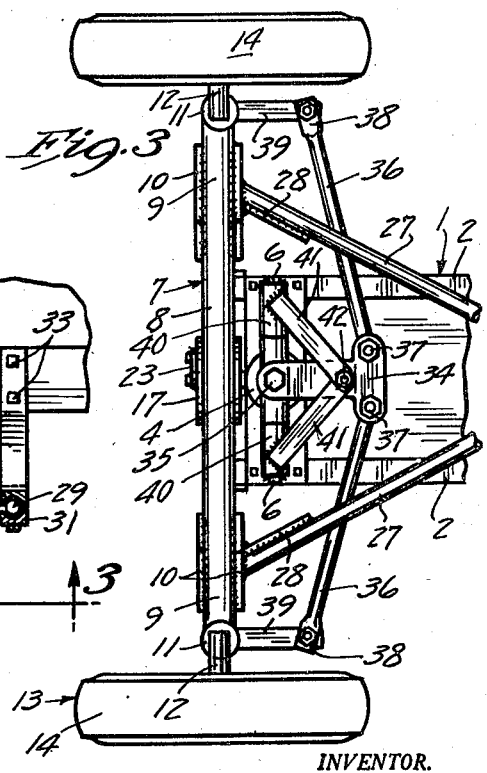
INVENTOR.
Raymond H. Calundan
BY
Merchant & Merchant
ATTORNEYS

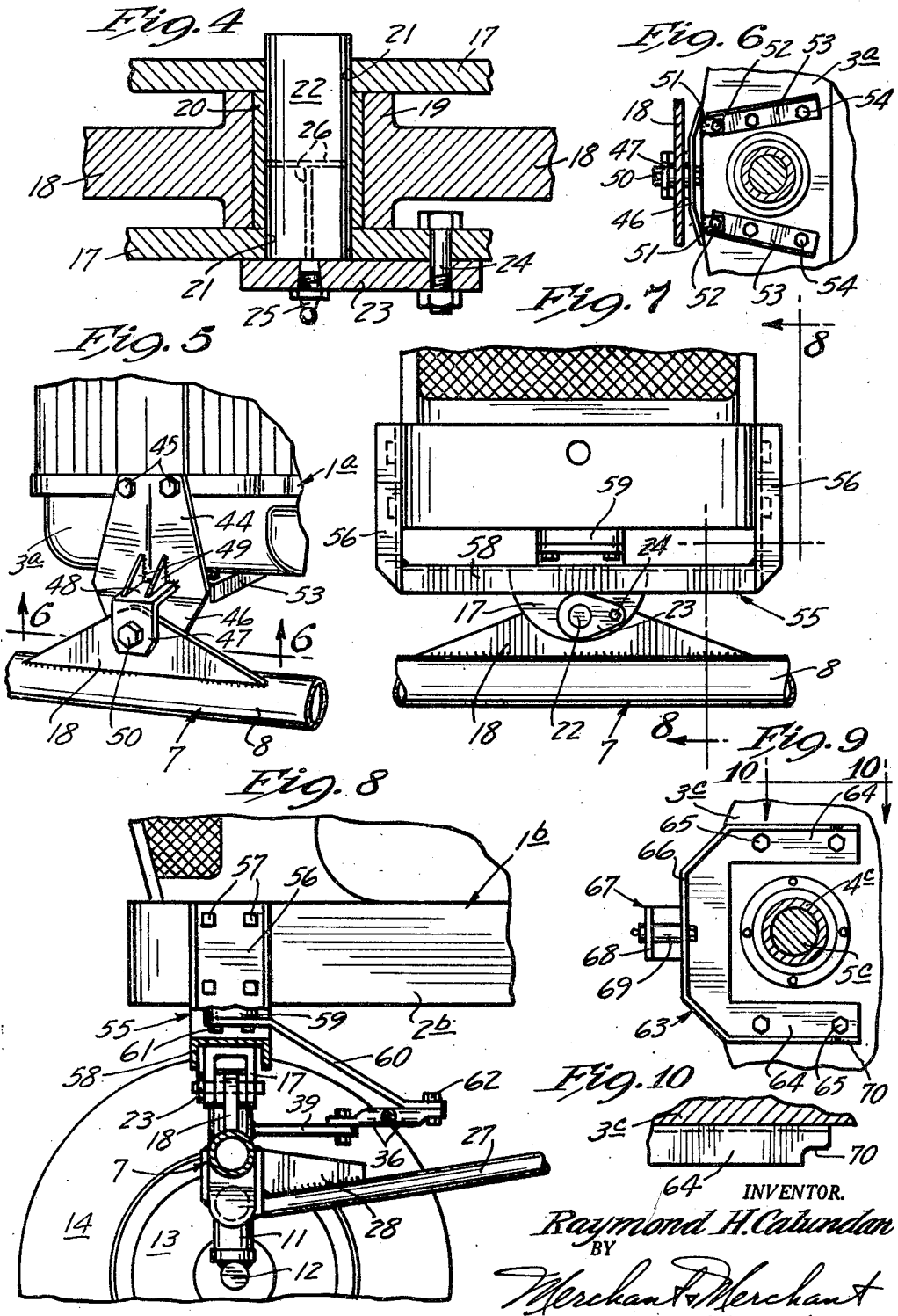

United States Patent Office 2,819,909
Patented Jan. 14, 1958

2,819,909
WIDE WHEEL FRONT END CONVERSION FOR TRACTORS

Raymond H. Calundan, Belgrade, Minn.

Application January 5, 1955, Serial No. 479,999

1 Claim. (Cl. 280—93)

My invention relates to steering equipment for automotive vehicles, and more particularly to steering attachments for agricultural tractors.

The primary object of my invention is the provision of a conversion attachment for tractors whereby narrow wheel front end steering tractors may be quickly and safely converted into wide wheel front end units.

A still further object of my invention is a provision of a device of the class described which comprises a minimum of parts, is inexpensive to produce, and durable in use.

A still further object of my invention is the provision of a device of the class described which is relatively easy to attach to and detach from the tractor, whereby said tractor may be converted from a narrow to a wide front end structure, and vice versa.

The above and still further objects of my invention will become apparent from the following detailed specification, attached drawings, and appended claim.

Referring to the drawings, wherein like characters indicate like parts throughout the several views:

Fig. 1 is a fragmentary view in front elevation of a conventional tractor having my attachment secured thereto;

Fig. 2 is a fragmentary view, partly in side elevation and partly in section, as seen from the line 2—2 of Fig. 1;

Fig. 3 is a view partly in bottom plan and partly in section, as seen from the line 3—3 of Fig. 2;

Fig. 4 is an enlarged fragmentary detail in horizontal section, taken substantially on the line 4—4 of Fig. 1;

Fig. 5 is a fragmentary view in perspective of the front end of a tractor, showing a modified form of tractor mounting means for my novel attachment;

Fig. 6 is a fragmentary view, partly in bottom plan and partly in section, taken substantially on the line 6—6 of Fig. 5;

Fig. 7 is a fragmentary view in front elevation showing a further modification;

Fig. 8 is a fragmentary view, partly in side elevation and partly in section, taken substantially on the line 8—8 of Fig. 7;

Fig. 9 is a view corresponding to Fig. 6, but showing a still further modification; and Fig. 10 is an enlarged fragmentary detail taken substantially on the line 10—10 of Fig. 9.

Referring with greater particularity to Figs. 1 to 4, inclusive, of the drawings, the numeral 1 indicates in its entirety the generally rectangular rigid frame of a conventional tractor, the side frame members of which are identified by the numeral 2, and the transverse front frame member by the numeral 3. Mounted within a housing 4 intermediate the side frame members 2, closely adjacent the connecting front end frame 3, is a vertical steering column 5, to the lower end portion of which is secured for rotation therewith about a vertical axis, a pair of diametrically opposed wheel mounting spindles 6. Adapted to be rotatively journaled on the spindle 6 are a pair, not shown, of conventional closely spaced front wheels.

The above described arrangement is normal with one type of tractor adapted for use with farm implements. This type of front wheel arrangement is particularly adapted to certain types of operations in the field and has certain advantages well known to farmers and others skilled in agricultural pursuits. For certain other operations in the field, it is more advantageous to dispose the front wheels in a widely spaced relationship, whereby the front wheels track with the normally widely spaced rear wheels. For the purpose of quickly and easily converting a tractor having closely spaced front wheels to an arragement whereby the front wheels are in widely spaced apart relationship I provide a novel conversion structure now to be described:

An axle 7 includes a relatively long primary tubular member 8, and a pair of aligned relatively short tubular members 9, rigidly secured to opposite end portions of the primary tubular member 8 in parallel relationship therewith. Preferably, and as shown, the relatively short members 9 are secured below the tubular axle 8 by means of webs or the like 10, which are welded at their opposite longitudinal edges to said members 8 and 9. As shown, the outer ends of the members 9 project outwardly beyond the opposite ends of the member 8. Rigidly secured to the outer end portions of the axle members 9 are vertical bearings 11, in which are journaled the king pins, not shown but projecting upwardly from stub shafts 12 upon which wheels 13, preferably and as shown having rubber tires 14 thereon, are rotatively mounted.

For the purpose of mounting the axle 7 to the frame 1 of the tractor, I provide a bracket element 15, which is of generally U shaped design, with its opposite end portions rigidly secured to the front end of the frame 1 by means of nut equipped bolts 16. As shown particularly in Figs. 2 and 4, the bracket member 15 is provided with depending, closely spaced parallel flanges 17, between which is received an upwardly projecting rib 18. Rib 18 extends longitudinally of the primary axle member 8 and is welded or otherwise rigidly secured to the top portion thereof. At its central portion, the rib 18 is provided with a boss 19, having a central aperture which receives a bearing sleeve 20. The bearing sleeve 20 is adapted to be in register with a pair of aligned openings 21 in the flanges 18, the common horizontal axis of which extends longitudinally of the tractor 1. A pivot pin 22 extends through the aligned openings 21 and the bearing sleeve 20, and at its front end is rigidly secured, by welding or the like, to an anchoring plate 23 which is detachably secured to one of the flanges 17 by a nut equipped bolt 24. A conventional fitting 25 is mounted in the anchoring plate 23, whereby grease or other lubricant may be supplied to the bearing sleeve 20 through passages 26 shown by dotted lines in Fig. 4.

A pair of radius rods 27 are connected at their front ends, each to a different one of the secondary tubular members 9, and are rigidly supported by reinforcing ribs 28 welded to the front ends of the radius rods 27 and to the webs 10. The radius rods 27 converge in a direction rearwardly with respect to the tractor, and terminate in a common ball element 29, which is received in a socket provided by a pair of cooperating upper and lower socket members 30 and 31 in the central portion of a U shaped rear supporting bracket 32. The opposite ends of the supporting bracket 32 are detachably secured to opposite tractor frame members 2 by machine bolts or the like 33. The ball joint 29—31 cooperates with the pivotal connection of the rib 18 to the flanges 17 to permit the pneumatic tire equipped wheels 14 to roll easily over uneven or rough terrain, thus avoiding the application of torsional strain to the tractor frame 1.

For the purpose of imparting steering movements to the wheels 13, I provide a steering tongue 34 that is rigidly secured at its front end to the bottom of the steering post 5 by means of a bolt 35. The tongue 34 extends angularly rearwardly and upwardly from the bottom of the steering post 5, and has pivotly secured to its rear end the inner ends of a pair of rigid steering links 36, as indicated at 37. The outer ends 38 of the links 36 are pivotly connected each to one of a pair of crank acting members 39, the inner ends of which are coupled to the king pins of each of the wheels 14 in the conventional manner. A pair of sleeves 40 are telescopically received, each on a different one of the wheel spindles 6, and are provided with angularly upwardly and rearwardly extending brace members 41 that are detachably secured, by means of a nut equipped bolt 42, to the rear end portion of the tongue 34. Cotter pins 43 are utilized to prevent axially outward movements of the sleeves 40 with respect to the spindles 6. The sleeves 40 shield the wheel spindles 6 against an accumulation of dust thereon, and, together with their respective brace members 41, brace the tongue 34 with respect to the steering rod 5, so that slippage there between is eliminated. Thus, the steering load is carried primarily by the members 41, the bolt 35 being utilized to merely support the tongue 34 in place against the bottom of the steering column or rod 5.

With the above described arrangement, the wheels 13 may if desired be those which were removed from the wheel spindle 6. In converting the tractor from its original narrow front wheel arrangement to its widely spaced apart front wheel arrangement, it is only necessary to elevate the front end of the tractor sufficiently to remove the wheels from the spindles 6, attach the brackets 15 and 32 to the tractor frame, place the tongue 34 and sleeves 40 on the steering column and spindles 6, respectively, and mount the wheels 14 on the stub shafts 12. When it is desired to reconvert the tractor to its narrow gauge front wheel arrangement, the reverse procedure is followed. In fact, if desired, the front bracket 15 may be left on the tractor, the front axle 4 being detached therefrom by removal of the pivot pin 22 from the flanges 17 and rib 18.

In the modified form of mounting bracket shown in Figs. 5 and 6, a plate-like member 44 is shown as depending from the front end 3a of a tractor frame shown fragmentarily and indicated at 1a, by means of bolts or the like 45. The plate-like member 44 is formed to provide a depending flange 46 which cooperates with a second flange 47 forwardly spaced therefrom, to receive there-between the rib 18 of the axle structure 7. The depending flange 47 forms the downturned portion of an angle member 48 that is welded or otherwise secured to the bracket member 44 and reinforced by spaced gussets 49. A pivot bolt or the like, 50 extends through suitable apertures in the skirt 46 and flange 47 and the bearing sleeve of the rib 18, whereby to permit rocking movements of the axle structure 7 in the same manner as does the pin or shaft 22 described in connection with the structure of Figs. 1 to 4, inclusive. If desired, the pivot pin 22 and anchoring plate 23 thereof may be used with equal facility in connection with the structure as with that of Figs. 1 to 4, inclusive. The plate-like member 44 is provided with a pair of rearwardly projecting lugs 51 to which are pivotly secured, as indicated at 52, a pair of brace members 53 made from commercial angle iron or the like. The brace members 53 are bolted or otherwise detachably secured to the underside of the frame member 3a, as indicated at 54.

In Figs. 7 and 8, a further modified form of mounting bracket is shown as comprising a generally U shaped member 55, preferably made from channel iron or the like, and having upwardly extended legs 56 which are detachably secured to two side frame members 2b of a tractor frame 1b, by means of bolts or the like 57. In this form of my novel construction the spaced flanges 17 are welded or otherwise rigidly secured to the intermediate portion 58 of the U shaped bracket member 55, and the rib 18 of the axle structure 7 is pivotly mounted between the flanges 17 by the pivot pin 22 anchored to one of the plates 17 by its anchoring member 23 and bolt 24. The mounting bracket 55 is adapted for use with tractors which are devoid of the housing member 4 and in which the wheel carrying lower end of the steering apparatus, not shown, is normally bolted to an upper section 59. With this type of construction, a steering tongue 60 is utilized, the front end thereof being secured to the lower end of the steering column section 59 by bolts or the like 61, the inner ends of the steering links 36 being pivotly secured to the rear end portion of the tongue 60 as indicated at 62. It will be noted, with reference particularly to Fig. 8, that the steering tongue 60 extends angularly rearwardly and downwardly from its front end portion to its rear end portion. With this arrangement my novel axle structure and steering apparatus is equally adapted to tractors of the type of Figs. 7 and 8 as with tractors of the type of Figs. 1 to 4 inclusive. Although not shown, the radius rods 27 and the mounting of the rear ends thereof is identical to that described in connection with Figs. 1 to 4 inclusive.

The form of mounting bracket illustrated in Figs. 9 and 10 is adapted to be bolted or otherwise rigidly secured to the under surface only of the front tractor frame member. This form of bracket is indicated generally at 63 and is of generally U shape, the opposite sides or legs 64 of which straddle the steering post or column 5c and the housing 4c therefor. As shown, the legs 64 are detachably secured to the under surface of the front frame member 3c by bolts or the like 65. The bracket 63 is provided with a depending flange 66, to the center portion of which is welded or otherwise secured an angle member 67, the down-turned portion 68 of which is in forwardly spaced relation to the skirt 66, and cooperates therewith to receive the rib 18 of the axle structure 7. A pivot bolt 69 is adapted to be received in aligned apertures, not shown, in the skirt 66 and depending portion 68, whereby to mount the axle structure 7 in the same manner as above described. Preferably and as shown, the skirt 66 extends to the rear end of the legs 64. The skirt 66 is notched out at the rear ends of the legs 64, as indicated at 70, whereby to provide clearance for the steering tongue, not shown, when my novel apparatus is applied to tractors utilizing the mounting bracket 63.

With the several types of mounting brackets shown in the drawings and described above, I am able to quickly and easily convert most of the present makes of manufacture of tractors of the so-called "close coupled" front wheel type of the widely spaced front wheel variety with a minimum of expense and with a minimum of time and effort. Furthermore, when desired, tractors equipped with my device may be as quickly and easily reconverted to their original narrow wheel arrangement, all without alteration of the tractor structure, except for the drilling of mounting holes in some of the frames thereof. It will be appreciated that the sleeves 40 not only shield the wheel spindles 6 from dust or other foreign matter which might adhere thereto, but also protect the wheel spindles 6 from being damaged by stones or other objects which might otherwise strike the spindles during movement of the tractor over rough stony ground.

My invention has been thoroughly tested and found to be completely satisfactory for the accomplishment of the objectives set forth; and while I have shown and described a commercial embodiment and several modified forms of my novel device, it will be understood that the same is capable of further modification without departure from the spirit and scope of the invention as defined in the claim.

What I claim is:

A wide wheel front end conversion for tractors including a centrally disposed steering column having generally horizontally disposed wheel mounting spindles projecting in opposite directions from its lower end portion, said attachment comprising a mounting bracket adapted to be releasably secured to the front end of a tractor frame independently of said steering column, a second bracket adapted to be secured to said tractor frame in rearwardly spaced relation to said first-mentioned bracket, said first-mentioned bracket including a pair of depending mounting flanges, an axle extending generally transversely of the tractor in underlying relation to said flanges, said axle comprising a relatively long primary tubular member, a pair of aligned relatively short secondary tubular members underlying the opposite end portions of said primary tubular member and rigidly secured thereto, the outer ends of said secondary tubular members extending beyond the adjacent end of the primary tubular member, wheel mounting means carried by the outer ends of said secondary tubular members, a generally rearwardly extending tongue bolted at its front end to the bottom of said steering column, a pair of rigid links pivotally connected at their inner ends to the rear end portion of said tongue and at their outer ends each to a different one of said wheel mounting means, a pair of sleeves telescopically mounted one each on the wheel mounting spindles of said steering column, said sleeves being substantially equal in length to the wheel carrying portions of said spindles, a pair of rigid arms each anchored at its front end to a different one of said sleeves, the rear ends of said arms being releasably anchored to the rear end portion of said tongue by a common bolt in spaced relation to the connection between the inner ends of said links to said tongue, a pair of rearwardly converging radius rods rigidly secured at their front ends to opposite end portions of said axle and pivotally secured at their rear ends to said second mounting bracket, and a longitudinally extending rib projecting upwardly from the central portion of said primary tubular member between the depending flanges of said first-mentioned mounting bracket, said rib being pivotally connected to said flanges for swinging movements about a horizontal axis extending longitudinally of the tractor.

References Cited in the file of this patent

UNITED STATES PATENTS

| | | |
|---|---|---|
| 696,596 | Robinson | Apr. 1, 1902 |
| 2,148,714 | Urschel | Feb. 28, 1939 |
| 2,178,505 | Warneke | Oct. 31, 1939 |
| 2,264,924 | Wolrab | Dec. 2, 1941 |
| 2,641,499 | Gassner | June 9, 1953 |
| 2,750,199 | Hart | June 12, 1956 |